INVENTOR.
NAOYOSHI TAGUCHI
ATTORNEY

United States Patent Office 3,695,848
Patented Oct. 3, 1972

3,695,848
GAS DETECTING DEVICE
Naoyoshi Taguchi, 1-2 Ikedauemachi, Nagata-ku,
Kobe, Japan
Filed Apr. 7, 1970, Ser. No. 26,228
Int. Cl. G01n 27/16
U.S. Cl. 23—254 E                    6 Claims

ABSTRACT OF THE DISCLOSURE

A gas detecting device for detecting inflammable gases which includes a semiconductor material, means for passing a current through the semiconductor material to determine changes in resistivity caused by the presence of the inflammable gas, and heating means for heating the semiconductor material to obtain an optimum sensitivity characteristic.

---

This invention relates to a device for detecting gases and smoke utilizing a metal oxide semiconductor element in which the electrical resistivity varies materially when exposed to inflammable gases such as hydrogen, carbon monoxide, alcohol vapor and gasoline vapor, and smoke.

Prior known devices for detecting gases and smoke have utilized resistivity variation of a platinum wire with changes in temperature. In such devices it is necessary to provide precise temperature compensation of the platinum wire and to use a multi-stage amplifier because of a minute change in resistivity at the time of detection. This results in a very complicated and expensive structure which prevents its use in wide domestic applications.

Another prior art device especially for detecting carbon monoxide utilizes dark discoloration of palladium chloride solution caused by the reducing action of carbon monoxide, which is detected by a photo-tube. In such a device, however, since water in the solution evaporates continuously, the evaporated water must be carefully supplemented continuously. Moreover, once a detecting operation is performed, the solution cannot be easily used again.

An object of this invention is to overcome the above-mentioned disadvantages of the various prior gas detecting devices and to provide a gas detecting device having very high sensitivity in the detection of gases and smoke and simplicity of structure and one which is capable of repeatedly detecting gases.

A gas detecting device according to this invention comprises a body of metal oxide semiconductor material in which the electric resistivity varies materially when exposed to gases and smoke, a pair of electrodes provided on said body to cause current to flow across at least a portion of said body, a heated for heating said body to improve the sensitivity of the body and to stabilize its resistivity characteristic variation, and an alarm means for generating an alarm when a resistivity change of the body is detected.

The objects and features of this invention will be clearly understood from reading of the following description with reference to the accompanying drawings.

Figure 1:
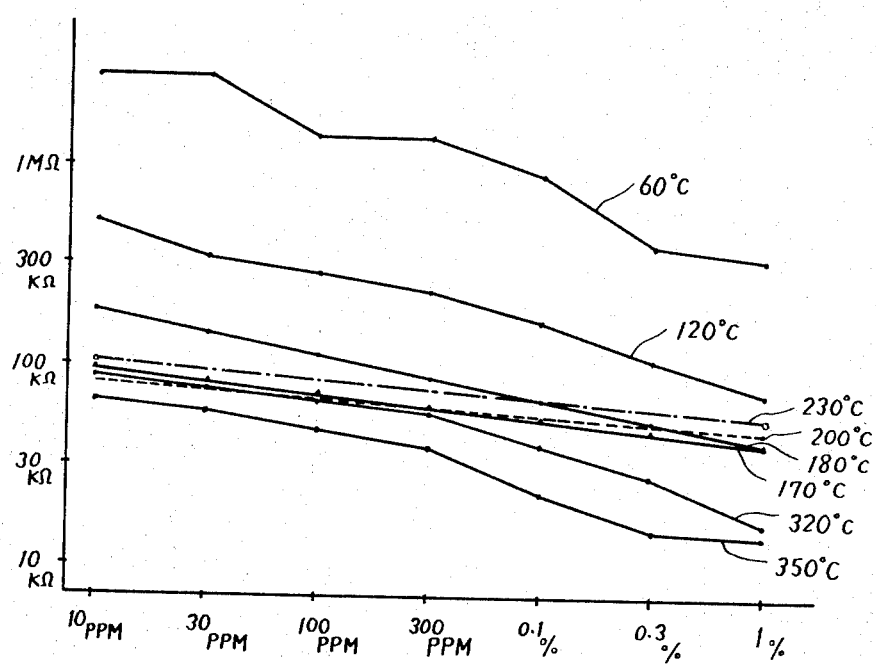
FIG. 1 is a graph representing the relation between temperature and gas detection sensitivity of a semiconductor sensing element used in a gas detecting device according to this invention.

Referring to FIG. 1, the resistance (ordinate) of a specific $SnO_2$ sensing element of a gas detecting device of this invention is plotted against concentration (abscissa) of isobutane in air and at various temperatures of the element. The slope of curves indicates detection sensitivity of the element. As clearly shown in the drawing, the detection sensitivity of the sensing element varies irregularly and discontinuously with respect to gas concentration at low temperatures such as 60° C. and at high temperatures such as 350° C. However, the curves are relatively uniform and continuous within a temperature range of about 150° C. to 250° C., and the sensing element is preferably used in this range. This is a reason why the gas sensing element of this invention is provided with a heating element.

Figure 2:
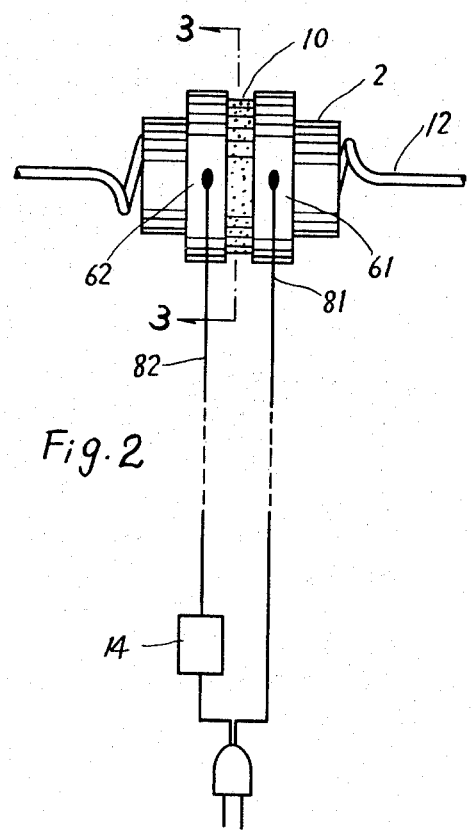
FIG. 2 is a side elevational view of one embodiment of a gas detecting device according to this invention.
Figure 3:
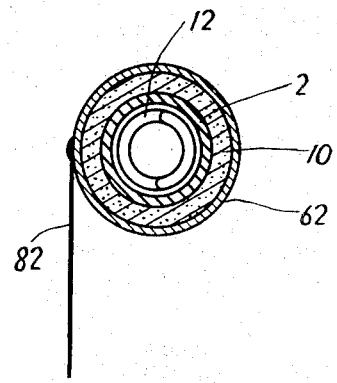
FIG. 3 is a cross-sectional view taken along the line 3—3 of FIG. 2.

Referring to FIGS. 2 and 3 illustrating a first embodiment of this invention, there shown is an insulating tube 2 formed of ceramic, for example. The thickness of the wall of tube 2 is preferably made as thin as possible while maintaining adequate mechanical strength. A ring-shaped metal oxide semiconductor body 10 is located on the surface of the middle portion of the insulator tubing 2. For instance, the metal oxide semiconductor may be $SnO_2$, which is a N-type semiconductor. The $SnO_2$ layer can be applied annularly about the insulator tubing as shown in FIG. 3 by compression forming, sintering or brushing with suspension in suitable medium. A thin film of $SnO_2$ can be used alternately as occasion demands.

Metal electrodes 61 and 62 are respectively deposited on the both faces of the metal oxide semiconductor body 10, so as to make an electrical contact therewith by use of a suitable method such as vapor deposition. Lead-out conductors 81 and 82 are connected to these metal electrodes 61 and 62 respectively and a helical heater 12 is positioned within the insulator tubing 2. The heater 12 may be straight when the insulator tubing has a small inner diameter.

In the above gas detecting device, the lead conductors 81 and 82 are connected in series, for example, with a buzzer 14 to a home electric line. At the same time, a suitable voltage is applied to the heater 12 to heat the metal oxide semiconductor body 10 at 150° to 250° C.

When the present gas detecting device is located in ambient air, the value of resistance of the metal oxide semiconductor body 10 is about ½ megohm. In this case, the buzzer generates no alarm since very little current flows through the buzzer 14. When the air contains town-gas of about one percent, however, the resistance of the metal oxide semiconductor body 10 drops down to about 1200 ohms and the buzzer generates an alarm. When the concentration of town-gas drops down substantially to about zero percent, the resistance of the metal oxide semiconductor body 10 returns to original ½ megohm within a short time such as several seconds to several minutes.

The metal oxide semiconductor material constituting the body 10 may be one having N-type conductivity, such as ZnO, $Fe_2O_3$, $TiO_2$, $V_2O_5$, $MnO_2$, $WO_3$, $ThO_2$, $MoO_3$, CdO or $PbCrO_4$, in addition to $SnO_2$ in the above embodiment. Gases such as $H_2$, CO, $C_2H_2$, $CH_4$, $C_2H_5OH$, $C_3H_8$ and $C_4H_{10}$ and smoke can also be detected. The conductivities of N-type metal oxide semiconductors such as $SnO_2$, ZnO, $Fe_2O_3$, etc., increase when they are exposed to the above gases for the following reason. In the case of $SnO_2$, for example, which is a semiconductor of N-type it exhibits an electrical conductivity depending principally upon electrons existing therein. If a gas as above-described contacts the crystals of $SnO_2$, the following reaction occurs in the crystals as the gas has inherent reducing activity.

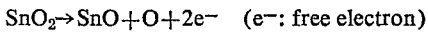

$$SnO_2 \rightarrow SnO + O + 2e^- \quad (e^-: \text{free electron})$$

The oxygen is dissipated leaving electrons of ionic bond in the crystals. This results in a number of free electrons in the crystals, thereby increasing the electrical conductivity. According to the results of experiments, it has been found that the conductivity variation of $SnO_2$ relates only to the concentration of the gas and is virtually independent of the time of exposure to the atmosphere containing the aboves gases. The conductivity variations of the other materials such as ZnO and $Fe_2O_3$ are produced in a similar manner.

The semiconductor body 10 can also be made of metal oxide semiconductor materials having P-type conductivity. Examples of such P-type metal oxide semiconductors which have been known in the art are $Cr_2O_3$, $MoO_2$, CoO and NiO. When these P-type metal oxide semiconductor materials are heated, they absorb excessive oxygen in the air to form a number of holes in the crystals, thereby exhibiting high conductivity. However, if the P-type semiconductor contracts the above-mentioned reducing gases or smoke, a number of vacancies of oxygen are produced in the above P-type semiconductor crystals to form many free electrons. These free electrons fill the holes to abruptly increase resistivity of the semiconductor.

In the case of the P-type semiconductor, it is necessary to substitute the buzzer 14 with a relay and to connect an alarm circuit to the contacts of the relay. This relay is arranged to be normally opened by energizing its electromagnet and only when a reducing gas or smoke is contained in the air, to close the contacts by de-energizing the electromagnet and activating an alarm.

When such P-type semiconductor is used, since the relay is always energized, power consumption increases considerably when compared to N-type semiconductors. However, since an alarm is activated whenever trouble such as disconnection occurs, such trouble will be detected immediately.

Figure 4:
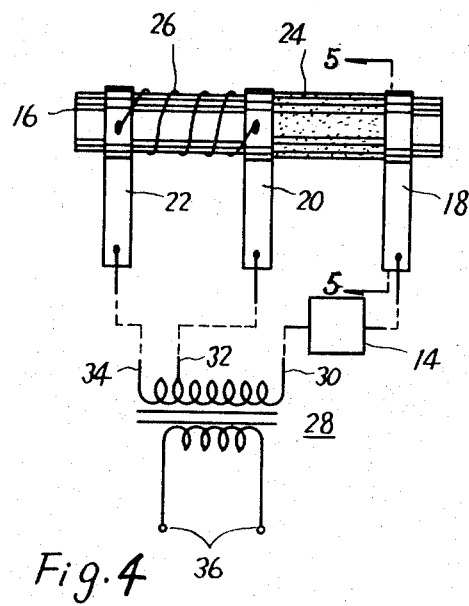
FIG. 4 is a side elevational view of a second embodiment of a gas detecting device according to this invention.
Figure 5:
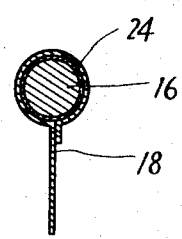
FIG. 5 is a cross-sectional view taken along the line 5—5 of FIG. 4.

FIGS. 4 and 5 represent a second embodiment of gas detecting device according to this invention. In the drawings, an insulating rod 16, for example, of ceramic has three electrodes 18, 20, and 22 fixed thereto. A thin layer 24 of a metal oxide semiconductor of N-type or P-type conductivity is provided as the main body between the electrodes 18 and 20. A heater winding 26 is wound between the electrodes 20 and 22 and the both ends of the heater winding 24 are respectively connected to the electrodes 20 and 22.

When the semiconductor layer is of N-type semiconductor as in this embodiment, the electrode 18 is connected through a buzzer 14 to one terminal of the secondary winding of a transformer 28 and the electrode 20 is connected directly to another terminal of the secondary winding. The electrode 22 is connected to a third terminal of the secondary winding of the transformer 28. When P-type semiconductor material is used as the thin layer 24, the buzzer 14 is replaced by a relay. The primary winding of the transformer 28 is connected to a supply line so that current flows through the heater 26 to heat the semiconductor layer 24 to desired temperature.

The gas detecting device of this embodiment of the invention also generates an alarm when the above-mentioned gases such as $H_2$, CO, $C_2H_2$, $CH_4$ and smoke are present in the air at a concentration higher than a pre-determined value. The operation of this gas detecting device is the same as the device shown in FIGS. 2 and 3.

Figure 6:
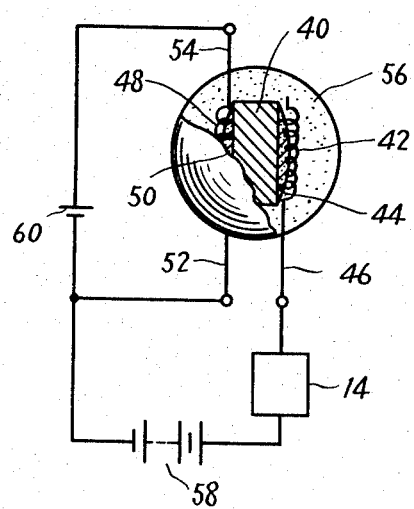
FIGS. 6 through 8 are elevational views in partial section of additional embodiments of a gas detecting device according to this invention.

FIG. 6 represents a third embodiment of gas detecting device according to this invention. In the drawing, an insulating plate 40 formed, for example, of ceramic has an electrode 42 composed of a suitable coiled conductor and fixed with solder glass 44 onto one face thereof. The electrode 42 has a lead-out conductor 46. A coiled heater 48 of Pt, Rd, Au, Ag, Nichrome or the like or an alloy thereof is similarly fixed with a glass adhesive 50 to the other face of the insulating plate 40. The heater 48 has lead conductors 52 and 54. The numeral 56 denotes a P-type or N-type metal oxide semiconductor shaped spherically around and enclosing the insulating plate 40.

In the gas detecting device according to this embodiment of the invention, the lead conductors 46 and 52 are respectively connected to the both ends of a series connection of a buzzer 14 of an alarm device including a relay and a power supply 58, and a heater current source 60 is connected between the conductors 52 and 54. When the concentration of the reducing gas such as $H_2$, CO, $C_2H_2$ or $CH_4$ or smoke in the air increases to a certain extent, electrical conductivity of the semiconductor 56 abruptly increases (in the case of N-type) or decreases (in the case of P-type). Therefore, the current flowing from the power supply 58 through the buzzer 14, the conductor 46, the electrode 42, the semiconductor 56, the heater 48 and the conductors 52 and 54 into the power supply 58 changes and the buzzer 14 can generate an alarm.

Figure 7:
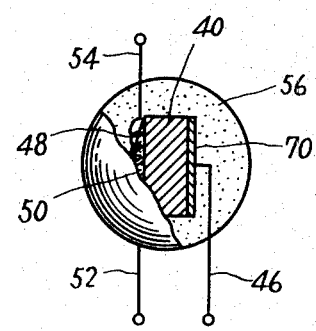

A gas detecting device according to a fourth embodiment and shown in FIG. 7 includes a metal electrode 70 formed by evaporation or baking on one face of an insulating plate 40, and a conductor 46 connected to the electrode 70. Other constructional and operational details of the gas detecting device are identical to those of the gas detecting device of FIG. 6, and further description thereof is not deemed necessary.

Figure 8:
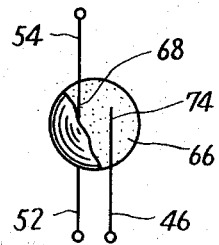

A fifth embodiment shown in FIG. 8 is especially suitable for fabricating relatively small gas detecting devices. In the drawing, a globular metal oxide semiconductor body 66 having a diameter of one millimeter or less includes a simple linear heater 68 extending therethrough and a straight electrode 74 inserted therein. The numeral 46 and the numerals 52 and 54 denote respectively lead conductors for the heater 68 and the eletcrode 74. In the illustrative embodiment, the conductors 46, 52, and 54 are shown as parts of the heater 68 and the electrode 74. As the operational principle of gas detecting device according to this embodiment is identical to that described in conjunction with FIG. 6, further explanation is not believed necessary.

Figure 9:
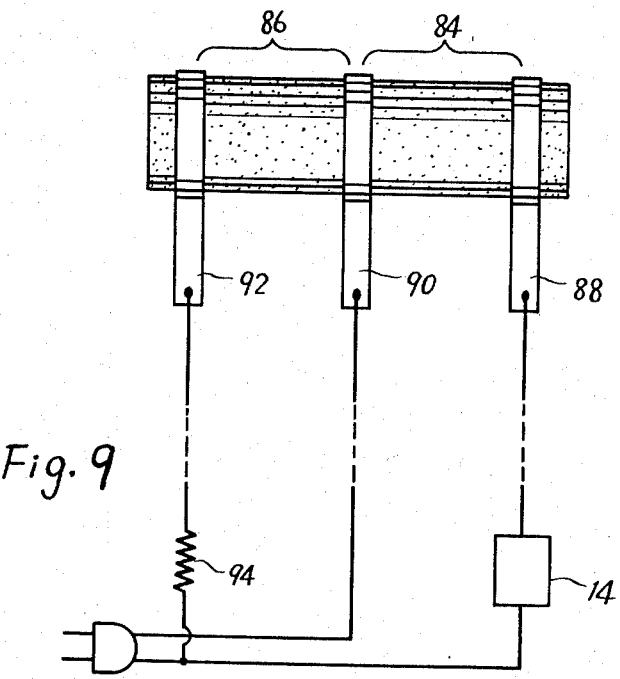
FIG. 9 is a side elevational view of still another embodiment of a gas detecting device according to this invention.

FIG. 9 represents a sixth embodiment of gas detecting device according to this invention, wherein a semiconductor having negative temperature coefficient of resistivity is used as the heater for heating the metal oxide semiconductor material.

As described above in connection with the preceding embodiments of the invention, the gas detecting semiconductor material used in the gas detecting device must be maintained at an elevated temperature such as 150° C. to 250° C. in order to improve the sensitivity of detection and to stabilize the characteristic. During the course of use, however, the atmospheric temperature difference sometimes exceeds 40° C., so that it is very difficult to maintain the temperature of the gas detecting semiconductor constant by a conventional heater utilizing Joule's heat from a metallic resistive wire. This embodiment includes a semiconductor material substantially constant regardless of ambient temperature variations.

FIG. 9 shows a rod-shaped gas detecting metal oxide semiconductor body 84 and a semiconductor rod 86 thermally coupled to the semiconductor body 84 and used as a heater. The material of the semiconductor rod 86 serving as a heater may not only be different than that of the gas detecting semicondutor 84 but may also be the same such as sintered $SnO_2$, formed in a single body. The numerals 88, 90 and 92 indicate electrodes provided in electrical contact with the both semiconductor rods respectively.

Figure 10:
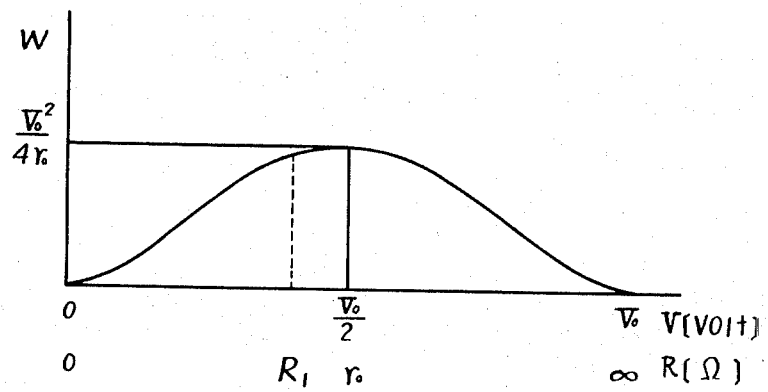
FIG. 10 is a graph for explaining the operation of the gas detecting device of FIG. 9.

As shown in the drawing, the electrodes 88 and 90 are connected through a buzzer or relay 14 to a power supply and the electrodes 90 and 92 are also connected through a stabilizing resistor 94 having a value, for example, $r_0$ (ohm). The resistance R of the semiconductor heater rod 86 is sufficiently higher than the resistance $r_0$ of the stabilizing resistor 94. At first, therefore, the major part of the source voltage $V_0$ is applied to the semiconductor heater 86 to heat it. With increase of the temperature of the semiconductor heater 86, the resistance thereof is lowered and the amount of calorification varies therewith. FIG. 10 represents a relation of variations of the amount of calorification and the resistance of the semiconductor heater 86. As clearly shown in the drawing, the maximum calorification $(V_0^2)4r_0$ is obtained when the resistance R of the semiconductor heater rod 86 is equal to the resistance $r_0$ of the stabilizing resistor 94. Therefore, if the resistance $r_0$ of the stabilizing resistor 94 and the resistance to temperature characteristic of the semiconductor material of the semiconductor heater rod 86 is previously selected so that a desired amount of calorification is obtainable at a point $R_1$ where $R_1=r_0$, the resistance R of the heater rod 86 becomes lower than $R_1$ to lower the amount of calorification if the ambient temperature rises and, on the contrary, R becomes higher than $R_1$ to increase the amount of calorification if the ambient temperature drops. Thus, the temperature of the gas detecting semiconductor body 84 is maintained substantially constant regardless of ambient temperature variations and the existence of gas can always be detected with the same sensitivity. Moreover, the semiconductor heater can be connected directly through the stabilizing resistor 94 to a commercial power supply as shown in FIG. 9 since it has a very high resistivity in comparison with conventional metal wire heaters. Therefore, the use of this semiconductor heater has the additional advantage that expensive step-down transformers for heaters are not required and an inexpensive device can be produced.

As described in conjunction with the above embodiments, the gas detecting device according to this invention can detect such gases as $H_2$, CO, $C_2H_2$, $C_4$, $C_2H_5OH$, $C_3H_8$, and $C_4H_{10}$, gasoline vapor, smoke, coal dust and the like with good sensitivity.

It is evident that this invention is not limited to the embodiments described above and includes various modifications. For example, such a detecting device can be used by being embedded in or assembled with a decorative doll or an artistic ornament. In this case, if the doll or the like is arranged to change its appearance when the detecting device operates, an amusing gas detecting device is obtained.

What is claimed is:

1. A gas detecting device comprising a main body formed of a metal oxide semiconductor material formed of crystals, said material changing its electrical conductivity upon contacting reducing gases in air, at least one pair of electrodes electrically coupled to said body and extending therefrom for the application of a voltage across at least part of said body, and means including at least one additional electrode extending from said body for heating said main body to stabilize its gas detecting sensitivity.

2. A gas detecting device according to claim 1 wherein said heating means includes a heater made of a material having a negative temperature coefficient of resistivity connected between the last said electrode and one of said pair of electrodes and said device includes a resistor connected in series with the last said means.

3. A gas detecting device according to claim 1 wherein said main body is formed of a metal oxide semiconductor material having the characteristic of increasing its conductivity upon contact with reducing gases in the air.

4. A gas detectng device according to claim 3 wherein said metal oxide semiconductor material consists of at least one selected from a group consisting of ZnO, $SnO_2$, $Fe_2O_3$, $TiO_2$, $V_2O_5$, $MnO_2$, $WO_3$, $ThO_2$, $MoO_3$, CdO, and $PbCrO_4$.

5. A gas detecting device according to claim 1 wherein said main body is formed of a metal oxide semiconductor material having the characteristic of decreasing its conductivity upon contact with reducing gases in the air.

6. A gas detecting device according to claim 5 wherein said metal oxide semiconductor material consists of at least one selected from a group consisting of $Cr_2O_3$, $MoO_2$, CoO and NiO.

References Cited

UNITED STATES PATENTS 3,036,895   5/1962   Cole _____ 23—232

OTHER REFERENCES

Seiyama et al., Anal. Chem. 38, No. 8, July 1966, 1069–1073.

MORRIS O. WOLK, Primary Examiner

R. M. REESE, Assistant Examiner

U.S. Cl. X.R.

73—27 R; 324—71 SN; 340—237 R